United States Patent [19]

Hora et al.

[11] 4,090,855

[45] May 23, 1978

[54] METHOD AND APPARATUS FOR SEPARATION OF GASEOUS PARTICLES OF DIFFERENT MASSES BY CENTRIFUGAL FORCES

[75] Inventors: Heinrich Wolfgang Hora, Ottobrunn; Friedbert Hans Karger, Munich, both of Germany

[73] Assignee: Gesellschaft für Kernverfahrenstechnik m.b.H., Jülich, Germany

[21] Appl. No.: 425,236

[22] Filed: Dec. 21, 1973

Related U.S. Application Data

[63] Continuation-in-part of Ser. No. 69,514, Aug. 6, 1970, abandoned.

[51] Int. Cl.² ................................................ B03C 1/00
[52] U.S. Cl. .................................. 55/2; 233/DIG. 1; 233/27
[58] Field of Search ........................... 233/DIG. 1, 27

[56] References Cited

U.S. PATENT DOCUMENTS 3,332,614  7/1967  Webster et al. ............... 233/DIG. 1

*Primary Examiner*—Stephen J. Lechert, Jr.
*Attorney, Agent, or Firm*—Spencer & Kaye

[57] ABSTRACT

A method and apparatus for separating a gas mixture which is at least partially ionized into a lighter and a heavier fraction by rapid rotation about an axis of a separating chamber by means of magnetic and electrical fields. The ionized gas mixture is enclosed in a closed static magnetic field configuration which is rotationally symmetrical about the axis of the separating chamber and the thus enclosed gas mixture is penetrated with an externally applied electric field whose field lines lie in planes containing the axis of the separating chamber and contain components which are perpendicular to the magnetic field.

8 Claims, 2 Drawing Figures

METHOD AND APPARATUS FOR SEPARATION OF GASEOUS PARTICLES OF DIFFERENT MASSES BY CENTRIFUGAL FORCES

CROSS-REFERENCE TO RELATED APPLICATION

This application is a continuation-in-part application of applicants' copending U.S. Application Ser. No. 69,514, filed Aug. 6th, 1970, now abandoned.

BACKGROUND OF THE INVENTION

The invention relates to a method for separating gaseous particles of different masses by centrifugal forces, whereby the gas is placed in a separation vessel, a rotation is produced, and the lighter or heavier component of the gas is collected in an area near the axis or far from the axis, respectively. Moreover, the invention relates to an apparatus for carrying out this method.

Well-known methods for separating gaseous particles of different masses, especially isotopes of elements, are the gas diffusion method, the separation nozzle and the method of gas centrifuges. The method of gas centrifuges results in the largest elementary separation effect. Nevertheless, practical applications, e.g., the separation of uranium isotopes, still need a relatively large number of single separating steps because the speed of rotation of the vessels is limited by their structural strength.

The above-mentioned, well-known methods all have the disadvantage that materials of solid consistency at room temperature have to be converted into gaseous compounds, e.g. uranium has to be changed to $UF_6$ prior to separation.

SUMMARY OF THE INVENTION

It is an object of the present invention to overcome these prior art disadvantages and to provide a method and an apparatus whereby an essentially larger separation effect is reached than is possible with the known methods and arrangements. In addition, according to the present invention, the materials can be used in the solid state and therefore in most cases in elementary modifications.

These aims are reached according to the present invention by a method for separating gaseous particles of different masses by centrifugal forces, where the gas is quickly rotated in a vessel about one axis, and the lighter or heavier component of the gas is collected in a region closer to or farther away from the axis, respectively, by means of transferring the gas at least partially into the plasma state. The plasma or ionized gas mixture is enclosed in a closed static magnetic field which is rotationally symmetrical about the axis of the separating chamber and the enclosed ionized gas mixture is penetrated with an externally applied electrical field whose field lines lie in planes containing the axis of the separating chamber and contain components which are perpendicular to the magnetic field. The combined interaction between the fields and the plasma produces forces in the direction of the circumference.

The plasma is produced preferably by an electrical discharge through gas between electrodes which build up the electrical field. When the method is utilized for the separation of an isotope of a material which is in the solid state at room temperature, at least one of the electrodes is made of the material to be separated. The material will be evaporated and ionized by the electrical discharge, and the plasma will be put into fast rotation by the interacting electric and magnetic fields to induce very high separation effects.

The method according to the invention allows rotation velocities which are larger than that of known gas centrifuges by up to a factor 100. The separation efficiency increases with the fourth power of the rotation speed and results in a value $10^4$ times larger than the values of the known gas centrifuges when all known effects of reducing the efficiency are taken into account.

DESCRIPTION OF THE PREFERRED EMBODIMENTS

Figure 1:
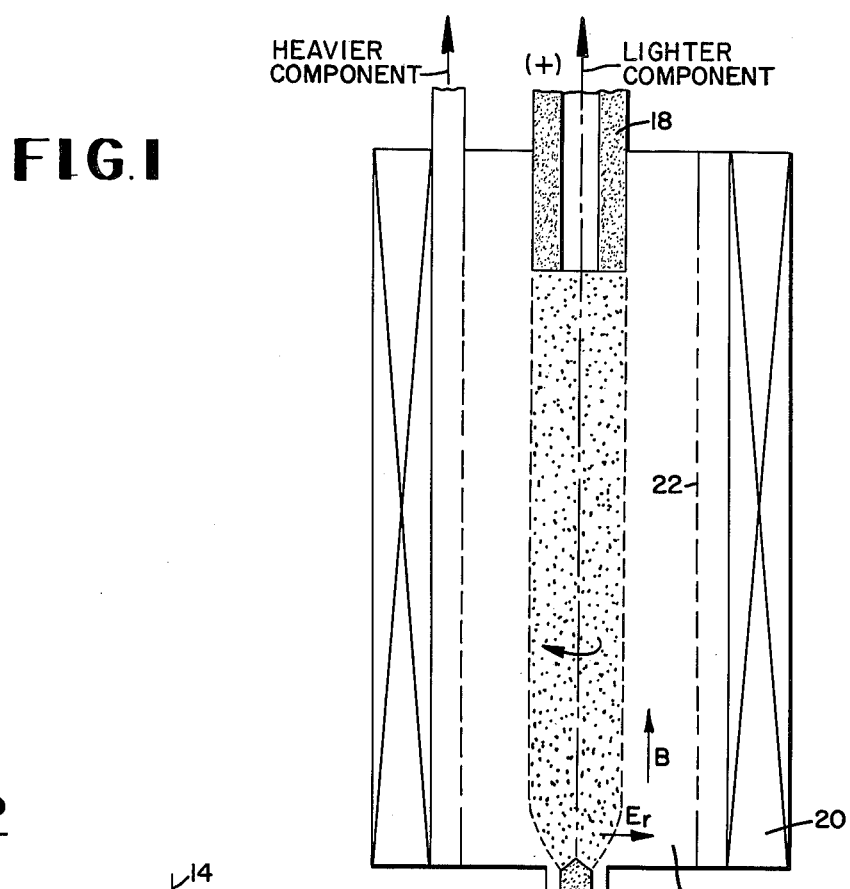
FIG. 1 is a schematic illustration of a first embodiment of an apparatus for realizing the method according to the invention.

The arrangement of FIG. 1 uses mainly a linear arc in a longitudinal magnetic field. The apparatus consists of a separation vessel 10, into which a gas, e.g., hydrogen, whose isotopes are to be separated is introduced through a pipe 12. The separation vessel 10 has the shape of a cylinder. Two electrodes 16 and 18 are located along the axis 14 of the cylinder. The electrode 16 is a circular bar and is operated as a cathode which is connected with the negative pole of a d.c. power supply, indicated schematically by the minus (−) sign.

The electrode 18, which is operated as an anode and is connected with the positive pole of the power supply (indicated schematically by the plus (+) sign), is designed as a hollow cylinder, the outer diameter of which is larger than the diameter of the electrode 16. The electrical field between the electrodes 16 and 18 and the traces of the charges moving along the field lines have then a radial component $E_r$ with respect to the axis 14, which is perpendicular to the direction of an axial static magnetic field B. The field B is generated by a cylindrical coil 20 surrounding the vessel 10 and connected with a d.c. power supply (now shown).

During operation, the separable gas is introduced into the vessel 10 via the pipe 12 and an arc is triggered between the electrodes 16 and 18. An azimuthal force is exerted in the arc plasma by the interaction of the magnetic field B and the current component resulting from the component $E_r$ of the electric field, which results in a fast rotation of the plasma around the axis 14. Thereby the heavier components of the plasma are caused to be concentrated in regions far from the axis, from where they can be extracted in a known manner through a mantle 22 with a perforated inner surface, and the lighter component is concentrated in an area close to the axis 14 where an extraction is possible through the hollow anode 18.

The arrangement of FIG. 1 allows speeds of rotation up to $4 \times 10^6$ cm/sec. Moreover, the arrangement of FIG. 1 permits relatively long arcs to be used because the separation effect will be favored by convection.

The arrangement of FIG. 1 is applicable for separation of isotopes of materials such as uranium, which are solid at room temperature. In this case, one or both electrodes 16, 18, preferably cathode 16, is made of the corresponding material, e.g. elementary uranium. The electrode will then be moved into the separation space according to its consumption. The heavier separated component can be condensed at the unperforated outer surface of the separation vessel, while in the middle or central space means are provided for the extraction of the lighter component, which may surround the cooled anode 18.

Figure 2:
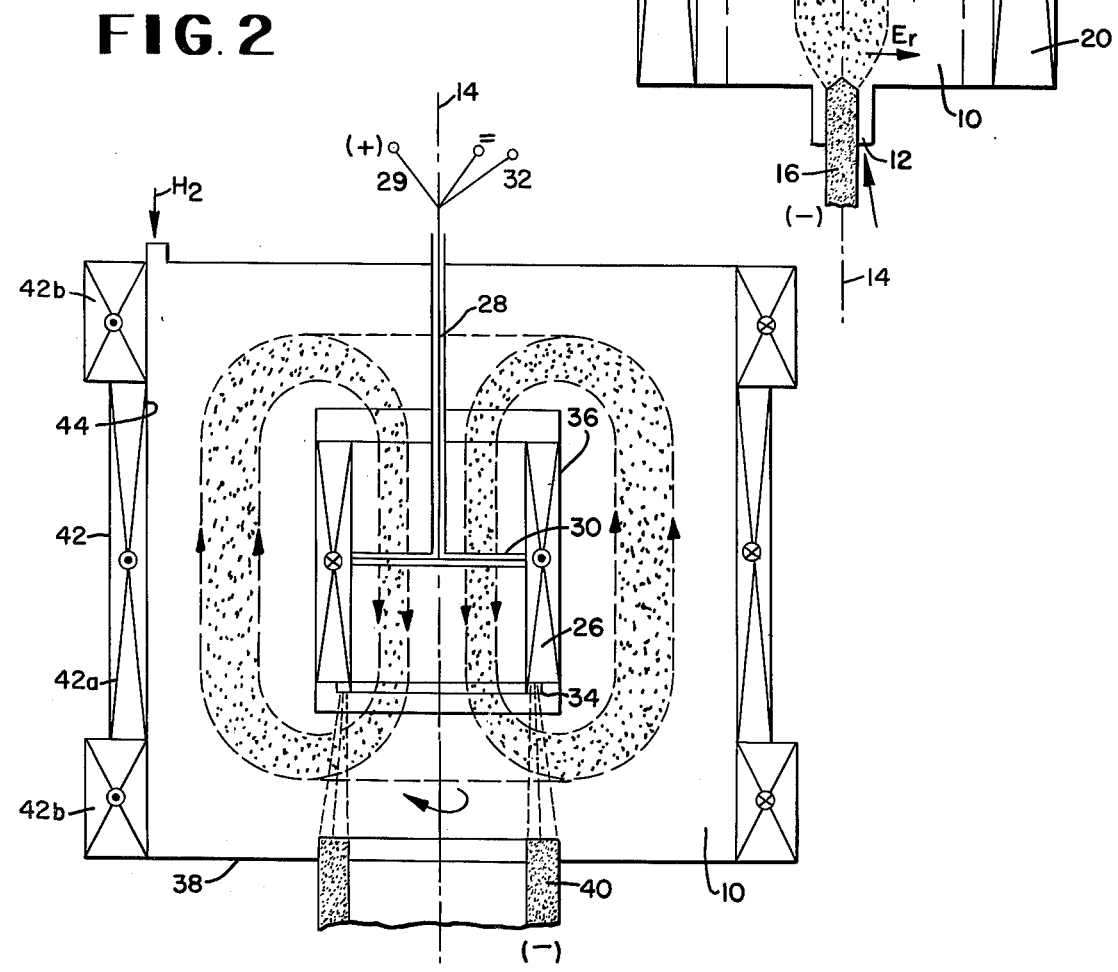
FIG. 2 is a schematic illustration of a second embodiment of an apparatus for performing the method according to the invention.

The arrangement, as described in FIG. 2, contains a cylindrical separation vessel or chamber 10, wherein a hollow cylindrical coil 26 is mounted coaxially with the axis 14 of the vessel. The coil 26 is mounted in the space 10 by means of an axially extending hollow ceramic pipe or rod 28 and a plurality of radially extending struts or buttresses 30, at least one of which is hollow. The ceramic pipe 28 and the hollow buttress 30 are used to contain and to protect the conduction wires 32 supplying the coil 26, and to contain the current supply lead 29 for a copper electrode 34 mounted on the lowest end of the coil 26 in a manner whereby it is rotationally symmetrical with respect to the axis 14. The coil 26 is surrounded by a hollow cylinder 36 whose outer surface forms a condensation surface.

The wall 38 of the separating vessel 10 in front of the electrode 34 is provided with a circular axial opening through which an electrode 40, which is designed as a hollow cylinder, extends into the separation space 10. The electrode 40 consists in this case of the material whose isotopes are to be separated, especially of metallic uranium. The electrode 34 is connected with the positive pole, and the electrode 40 is connected with the negative pole of a d.c. source (not shown but indicated schematically by the + and − signs, respectively) which supplies a sufficiently high voltage to maintain the arc between the electrodes 34 and 40. The cathode electrode 40, consisting of massive uranium, is mounted by an arrangement not described in detail, which allows axial movement of the cathode electrode 40 into the interior of separation vessel 10.

The separation vessel 10 is surrounded by an auxiliary coil 42 with an inner cylindrical coil 42a and short cylindrical coils 42b at the ends. The auxiliary coil 42 is designed in such a way that the magnetic field strength is stronger near the coil 42b than near coil 42a. The coil 42 is connected to a d.c. power supply (not shown) in a manner so that the current flows therethrough in a direction opposite that in the coil 26. The mirror field produced by the coil 42 is used for a magnetic confinement of the plasma.

In operation, the electric arc is started between the electrodes 34 and 40 and the created plasma is driven on by the electric field between the electrodes 34 and 40 together with the magnetic field $B_S$ of the coil 26.

The rotation speed is limited by the inequality $$(m/2)v^2 < e\, U_i \quad (1)$$

where $m$ is the ion mass, $v$ the rotation velocity, $e$ the elementary charge and $U_i$ the ionization potential. This condition applies only at those points where the magnetic field lines cross the insulator coating of coil 26, the result being that speeds of rotation which are larger by a factor 3 can be reached in the outer areas.

In the case of a uranium plasma, the rotation speed $v$ is not very high because of the large ion mass. Therefore a light gas like hydrogen or helium is preferably introduced into the separation vessel 10 to create, e.g., a uranium-hydrogen plasma. Because of the large mass difference in the centrifugal forces, the hydrogen is concentrated near the coil 26 while uranium is concentrated in the space between the cylinder 36 and the inner surface 44 of the separation vessel 10. By this means, a rotation velocity can be reached which is close to that of the pure hydrogen.

The mixing of uranium and hydrogen is performed during the discharge. The discharge is initiated with pure hydrogen and the ratio of the mixture is controlled thermally at the vertically movable cathode 40 of uranium. Cathode 40 can be equipped with a not described cooling mechanism, e.g. a cooling jet stream or water cooling.

The lighter component leaves the rotating plasma by diffusion preferably towards the cylinder 36 which acts as collector, while the heavier component is condensed in a known manner at the outer wall 44 of the separation vessel. This allows a continuous or a pulsed operation.

With the arrangement of FIG. 2 rotation velocities of $6 \times 10^6$ cm/sec can be produced.

The magnetic field of the arrangement of FIG. 2 has to be of such a value that on the one hand it is large enough to confine the plasma and on the other hand is not so high that an excessively high electrical field would be required and self-diffusion of the ions in the plasma across the magnetic field would be hindered too much.

Preferably the following conditions are to be fulfilled:

$$\omega_e \tau_e \gg 1 \quad (2)$$

$$\omega_i \tau_i < 1 \quad (3)$$

Here $\omega_e$ and $\omega_i$ are the cyclotron frequencies of the electrons and ions, respectively, and $\tau_e$ and $\tau_i$ are the collision times of the electrons and ions in the plasma, respectively. In operation, a value for the product $\omega_i \tau_i$ which is a little smaller than 1 can be used because the self-diffusion of the ions in the plasma across the magnetic field is not hindered too much. The conditions necessary to satisfy these expressions are well known to those skilled in the art, e.g. see L. Spitzer, Physics of Fully Ionized Gases, Interscience, New York (1956), pages 2 and 78.

The examples described above can be modified obviously in different ways without exceeding the scope of this invention. For example, the coil 26 can be mounted in another way, but preferably care should be taken, that the plasma rotating in the interior of coil 26 is not disturbed or put in turbulence, because such disturbances may decrease the separation effect if these are of influence in the interior of coil 26 or at the inner surface 44 of the separation vessel. The arrangement of FIG. 2 will cause a minimum of disturbances, if the coil 26 is mounted by the axial ceramic pipe 28 and two buttresses 30 extending in a diagonal direction at the center of the coil 26.

Coil 26, the cylinder 36, and the electrode 34 can be equipped with a cooling system, particularly water cooling, in a manner which, although not shown, is well known to those skilled in the art.

Instead of making both electrodes of the material which is to be separated, other possibilities can also be used to put the material in the separation vessel into the plasma state, e.g. as a powder, as vapor, or as a wire which is moved into the arc zone.

An apparatus constructed according to the FIG. 2 embodiment of the invention would typically have a separating vessel 10 with a length of from 110 to 200 cm and a diameter of 100 cm, a coil 26 with a length of from 50 to 120 cm and a diameter of 40 cm, and an axial distance between the anode electrode 34 and the cathode electrode 40 of 30 cm. With these dimensions, the voltage supplied across electrodes 34 and 40 to maintain the arc and produce the electrical field should be 3–5 kV and the magnetic field produced by the coil 26 should have a maximum field strength of about 10 kGauss. In such a prepared vessel 10 hydrogen gas $H_2$ is introduced. The applied voltage induces a discharge between the anode and the cathode. The generated plasma is moved by the magnetic field configuration into the toroidal configuration drawn by the dotted area. The surface of the uranium electrode is heated up by the discharge and emits uranium atoms into the plasma where they are ionised. These ions result in an uranium plasma in the outer region of said toroidal configuration, which does not touch the strutts 30. By this way the uranium plasma reaches rotation velocities of more than $10^6$ cm/sec causing an excellent separation of the uranium isotopes U235 and U238.

It will be understood that the above description of the present invention is susceptible to various modifications, changes and adaptations and the same are intended to be comprehended within the meaning and range of equivalents of the appended claims.

We claim:

1. Apparatus for separating a gas mixture which is at least partially ionized into a lighter and a heavier fraction by rapid rotation about an axis of a separating chamber by means of magnetic and electrical fields, comprising:

a hollow cylindrical separating chamber;
   first means for producing a closed static magnetic field configuration within said separating chamber which is rotationally symmetrical about the longitudinal axis of said chamber, said first means including a hollow cylindrical electrical coil mounted within said separating chamber and disposed coaxially about said longitudinal axis of said chamber, a direct current source being connected to said coil, an auxiliary coil arrangement coaxially arranged with said separating chamber and extending along the outer surface of the longitudinally extending wall thereof, and direct current source means connected to said auxiliary coil arrangement for supplying a current thereto which flows in the direction which is opposite to the direction of the current through said hollow cylindrical electrical coil; and
   second means for producing a plasma of the gas mixture along said longitudinal axis within said separating chamber and for producing an electrical field within said separating chamber whose field lines lie in planes containing said longitudinal axis, said second means including a first arc electrode mounted on one end of said cylindrical coil and along said longitudinal axis, a second arc electrode disposed within said separating chamber on the end wall of said separating chamber which faces said first arc electrode, said second arc electrode being opposite and axially aligned with said first arc electrode, and voltage source means for applying a potential across said first and second arc electrodes.

2. Apparatus as defined in claim 1 wherein said auxiliary coil arrangement is dimensioned so that it produces a higher magnetic field strength at its ends than in its central region.

3. Apparatus as defined in claim 1 wherein said first and second arc electrodes are arranged to be rotationally symmetrical with respect to said longitudinal axis.

4. Apparatus as defined in claim 1 wherein said apparatus is used for the separation of the isotopes of a material which is in the solid state at room temperature, wherein the one of said first and second arc electrodes which serves as the cathode consists of said solid material whose isotopes are to be separated; and wherein deposition surfaces are disposed on the inner wall of said separating chamber and on the outer wall of said hollow coil disposed in the separating chamber.

5. Apparatus as defined in claim 4 wherein said second arc electrode serves as the cathode and wherein said second arc electrode comprises a hollow cylinder which is mounted so that it is displaceable along said longitudinal axis.

6. Apparatus as defined in claim 4, including means for introducing a light gas into said separating chamber.

7. Apparatus as defined in claim 1 wherein said hollow cylindrical electrical coil is mounted in said separating chamber by means of an axially extending ceramic rod which is attached to the end of said chamber opposite said first-mentioned end wall, and at least one radially extending ceramic strut which is arranged approximately in the center of said cylindrical electrical coil when considered in the axial direction, said strut having one end connected to said rod and the other end connected to said cylindrical electrical coil.

8. Apparatus as defined in claim 7 wherein said rod and said strut are hollow and wherein the current supply leads for said hollow electrical coil and for said first arc electrode are contained within said rod and said strut.

* * * * *

UNITED STATES PATENT AND TRADEMARK OFFICE
CERTIFICATE OF CORRECTION

PATENT NO. : 4,090,855
DATED : May 23rd, 1978
INVENTOR(S) : Heinrich Wolfgang Hora et al It is certified that error appears in the above-identified patent and that said Letters Patent are hereby corrected as shown below:

In the heading of the patent, please add --[30] Foreign Application Priority Data: Aug. 27, 1969, Germany 1943588 --.

Column 2, line 42, change "now" to --not--.

Column 4, line 27, change "$\omega_i \tau_i < 1$" to --$\omega_i \tau_i \lesssim 1$--.

Signed and Sealed this

Seventh Day of August 1979

[SEAL]

Attest:

Attesting Officer

LUTRELLE F. PARKER
Acting Commissioner of Patents and Trademarks